Patented July 16, 1929.

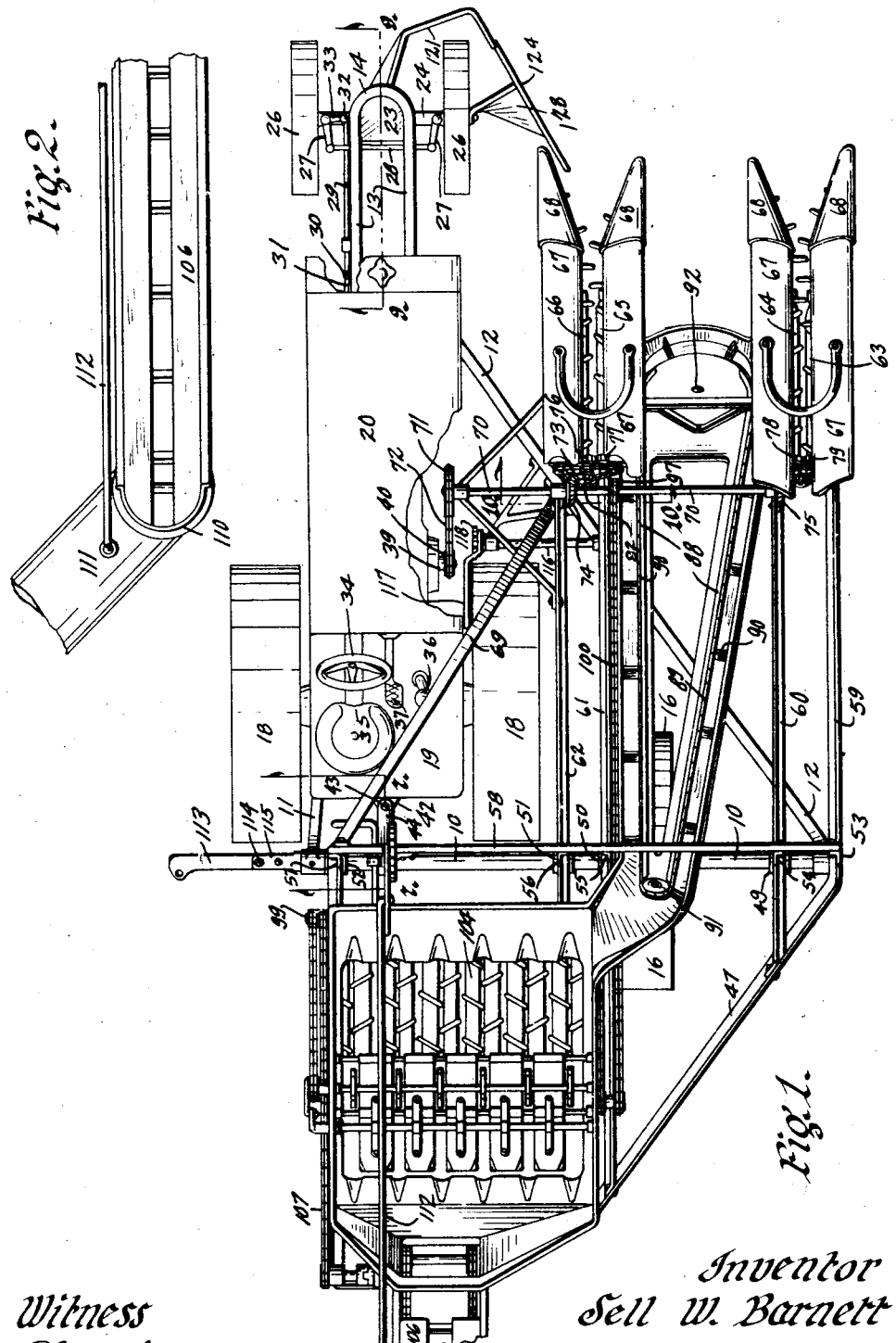

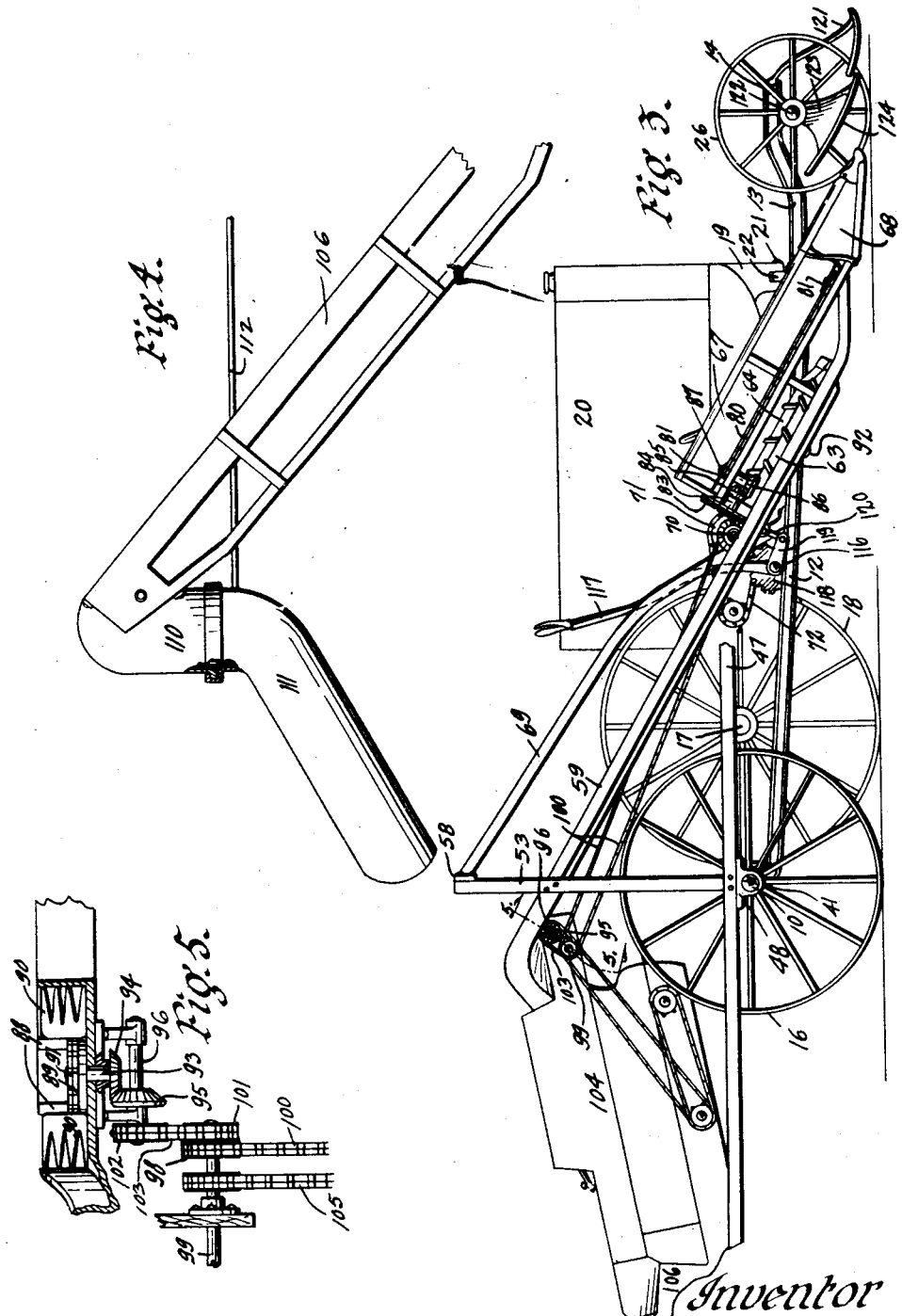

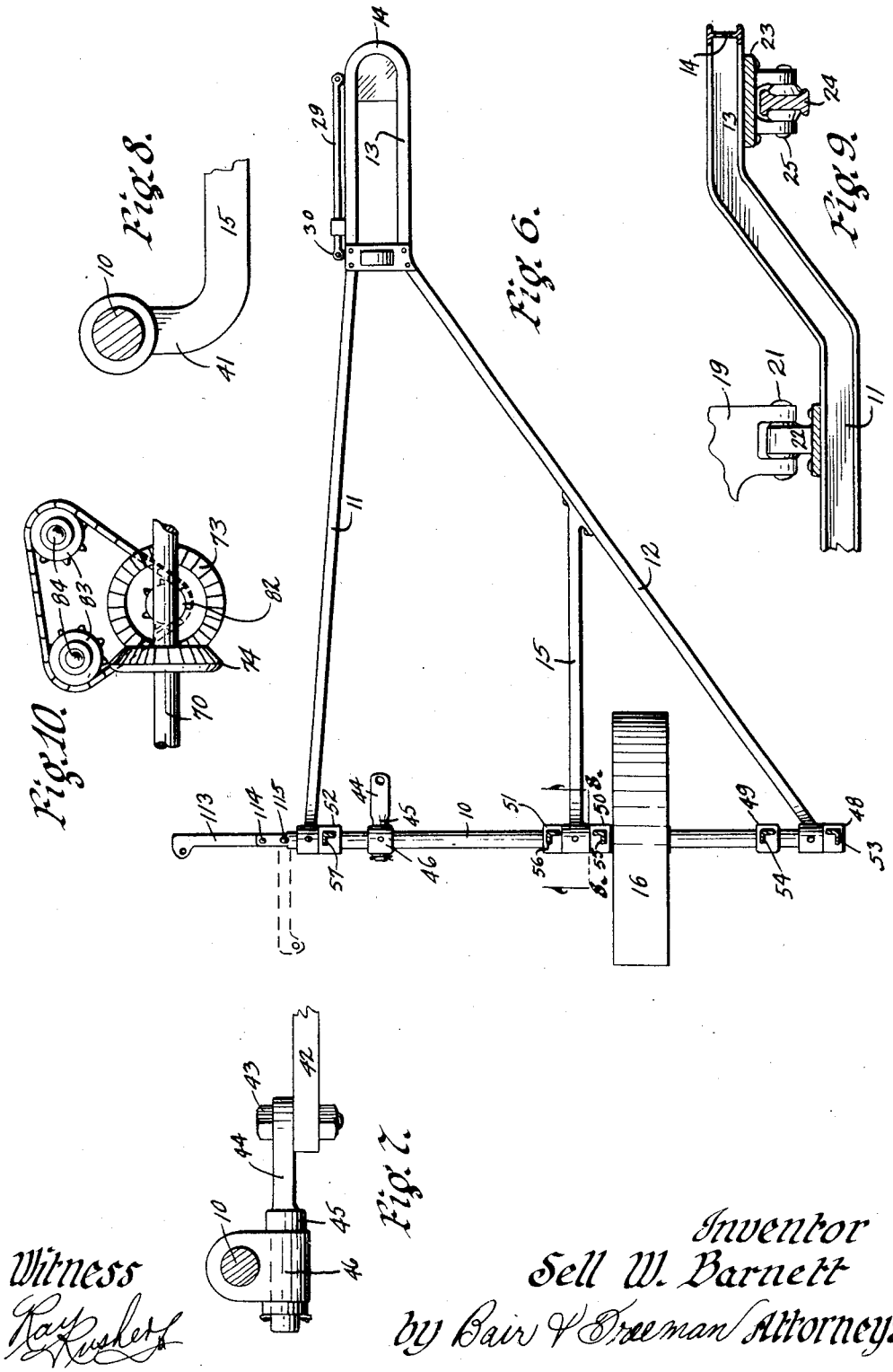

1,720,713

UNITED STATES PATENT OFFICE.

SELL W. BARNETT, OF WEBSTER CITY, IOWA.

CORN PICKING AND HUSKING MACHINE.

Application filed August 31, 1925. Serial No. 53,658.

The object of my invention is to provide a corn picking and husking machine peculiarly built and adapted to be assembled in connection with a tractor.

It is my special purpose to provide such a corn picking and husking machine in combination with a tractor, the picking and husking machine having a frame peculiarly adapted to be mounted on or connected with the tractor for permitting proper adjustment of the corn picking mechanism according to any inequalities in the surface of the land regardless of the position of the tractor.

My invention is somewhat similar in other respects to my corn picking and husking machine disclosed in my application for patent heretofore filed January 7, 1925, Serial No. 1,119.

With these and other objects in view, my invention consists in the construction, arrangement and combination of the various parts of my corn picking and husking machine, whereby the objects contemplated are attained, as hereinafter more fully set forth, pointed out in my claims, and illustrated in the accompanying drawings, in which:

Figure 1 shows a top or plan view of a corn picking and husking machine embodying my invention, parts being broken away for the better illustration of the other parts.

Figure 2 is a top or plan view of the rear end of the elevator and conveyor for the husked corn.

Figure 3 is a side elevation of the machine, parts being broken away.

Figure 4 is a side elevation of the rear end of the elevator.

Figure 5 is a detail, sectional view taken on the line 5—5 of Figure 3.

Figure 6 is a plan view of part of the machine frame.

Figure 7 is a detail, sectional view of part of the frame taken on the line 7—7 of Figure 1.

Figure 8 is a detail, sectional view taken on the line 8—8 of Figure 6.

Figure 9 is a detail, sectional view taken on the line 9—9 of Figure 1; and

Figure 10 is a sectional view taken on the line 10—10 of Figure 1.

It is my purpose to provide a corn picking and husking machine particularly adapted to be assembled in connection with a tractor.

The frame of the picking and husking machine is so arranged that the front axle and the front wheels of the tractor may be removed from the tractor frame and set ahead on the frame of the picking and husking machine.

In the accompanying drawings, I have indicated by the reference numeral 10 the main axle of the picking and husking machine, which forms the rear member of a substantially triangular frame.

Fixed to the axle 10 near the left-hand end thereof in the machine is a forwardly extending frame member 11.

Fixed to the right-hand end of the axle 10 is a frame member 12 extending forwardly and inwardly as shown in Figure 6. The forward end of the frame member 12 has a portion 13 inclined at an obtuse angle to the main body of the member 12 and extended forwardly substantially parallel with the forward end of the frame member 11.

The forward ends of the frame member 11 and the frame member 13 are connected as at 14.

A brace frame member 15 may be extended from the member 12 approximately halfway between the axle 10 and the portion 13 and thence rearwardly to the axle 10 to which it is fixed.

Rotatably mounted on the axle 10 is a large wheel 16.

I will now describe the manner of assembling the frame of the picking and husking machine on the tractor.

The front axle and wheels of the tractor are removed. I have shown a tractor having the main axle 17 on which are the large wheels 18, the frame 19 and the engine 20. The lower front portion of the tractor frame 19 is supported on a vertical fore-and-aft pivot shaft 21 mounted in a bracket 22 supported on the frame member 11 and on the frame member 12 and its portion 13 at their point of connection, as shown in Figure 9.

Fixed below the forward ends of the members 11 and 13 is a bracket 23 in which is pivoted the tractor axle 24 on a fore-and-aft pivot shaft 25. The steerable front wheels 26 of the tractor are mounted on the axle 24 in the usual way and are provided with the steering knuckles 27 connected by the rod 28.

Slidably mounted on the member 11 is a rod 29, which is pivoted at its rear end as at 30 to the tractor steering gear 31 and at its forward end, as at 32, to a short arm 33 connected with one of the knuckles 27, as shown in Figure 1.

The tractor has the ordinary steering wheel 34, the seat 35, gear shift structure 36, and foot pedal control 37.

The tractor has the power shaft 39 on which is a sprocket 40 for taking power from the tractor for operating the parts of the picking and husking mechanism.

The construction of the picking and husking mechanism is much the same as that described in my application hereinbefore referred to.

It will be noted that the right-hand tractor wheel 18 is located to the left of the picking and husking machine wheel 16 far enough to permit a row of stalks to pass between such wheels.

It may be mentioned that the frame members 12, 15 and 11 are up-turned at their rear ends as indicated at 41 in Figure 8, so as to allow the members 12, 15 and 11 to stand below the tractor frame and yet to allow the axle 10 to stand at the right height.

The draw bar 42 of the tractor has pivoted thereto by the vertical pivot 43, a bar 44, the rear end of which is made cylindrical as at 45, and is journaled in a bracket 46, which is in turn pivotally mounted on the shaft 10 as shown in Figure 7.

An auxiliary frame, which will now be described, is pivotally supported on the axle 10. Fore-and-aft frame members 47 are fixed to boxings 48, 49, 50, 51 and 42. (See Figures 3 and 6). Extending upwardly from each of these frame members are uprights 53, 54, 55, 56 and 57. (See Figure 6).

The uprights 53 to 57 inclusive are connected at their upper ends by a transverse frame member 58. Extending downwardly and forwardly from the upper portions of the uprights 53 to 56 inclusive are inclined frame members 59, 60, 61 and 62, extending forwardly and downwardly and supporting the snapping rolls.

My device is a two-row corn picker and has the two pairs of snapping rolls 63 and 64 and 65 and 66, partially covered by shields 67.

At the lower forward ends of the rolls are the gathering arms 68.

An inclined brace 69 extends from the upright 57 downwardly and forwardly and toward the right and is connected with the frame member 62.

Supported on the frame members 60 and 62 is a transverse shaft 70 on one end of which is a sprocket 71 in line with the sprocket 40 on the shaft 39, of the engine.

A chain 72 travels on the sprockets 40 and 71 for transmitting power from the engine to the shaft 70.

The corn picking and husking mechanism of this machine is substantially the same as that shown in my prior application and is therefore not described with such detail as might be otherwise necessary.

On the shaft of the roll 66 is a beveled gear 73, which meshes with a beveled gear 74 on the shaft 70. Similarly the shaft of the roll 64 has a beveled gear 73, which meshes with a beveled gear 75 on the shaft 70.

Rotation is transmitted from the roll 66 to the roll 65 by means of pinions 76 and 77 shown in Figure 1, and similarly rotation is transmitted from the roll 64 to the roll 63 by means of pins 78 and 79.

Gathering chains are provided for the rolls, each roll having an endless chain 80 mounted on suitable sprockets 81.

On the shafts of the rolls 66 and 64 are sprockets 82 in line with sprockets 83 on stub shafts 84.

On the stub shafts 84 are beveled gears 85 (see Figures 1 and 3) which mesh with beveled gears 86 on a shaft 87, which support the upper sprockets 81 for the gathering chains 80.

Thus power is transmitted from the shaft 70 to the sprockets 82 and thence to the sprockets 83, the shafts 84 and through the beveled gears 85 and 86 to the shafts 87 and the upper sprockets 81 and chains 80.

Arranged to receive from the snapping or picking rolls is a continuous trough 88 substantially triangular in general outline with the base of the triangle, which is curved, arranged between the pairs of picking rolls as shown.

Traveling in the trough is an endless conveyor comprising a chain 89 having projecting fingers 90.

At the upper small end of the triangle, the chain 89 passes around a small sprocket 91 and at the lower end around a large sprocket mounted on the shaft 92.

The sprocket 91 has a shaft 93, which projects downwardly through the bottom of the trough 88, as shown in Figure 5, and carries a beveled gear 94 meshing with a beveled gear 95 on the short shaft 96.

On the shaft 70 is a sprocket 97 (see Figures 1 and 5) in line with the sprocket 98 on the transverse shaft 99.

A chain 100 travels on the sprockets 97 and 98 for transmitting motion from the shaft 70 to the shaft 99.

On the shafts 99 and 96 are sprockets 101 and 102 (see Figure 5) on which travels a chain 103 for transmitting power to the shaft 96 and the endless conveyor chain 89.

The husking mechanism indicated in Figure 1 at 104 is actuated by gearing mechanism not shown.

Extending upwardly and rearwardly from the husking mechanism 104 is an endless conveyor structure 106 actuated by means of a chain 107 from the shaft 99. The endless conveyor 106 discharges into a short chute 110 on which is rotatably mounted an inclined discharge pipe 111, which may be swung to different positions by means of the controlling rod 112.

I do not more fully describe these operating mechanisms, because they could be greatly modified and could be made of standard construction or could be as shown in my prior application.

It is, however, of importance that the picking mechanism should be located at the side of the tractor and the husking mechanism behind the tractor, so that the machine may be balanced from side to side and also be balanced from front to rear over the axle 10.

On the axle 10, there is pivoted a draw bar 113. A removable pin 114 may be inserted through the bracket 115 and the draw bar 113, and a wagon hitched to the draw bar 113. When the draw bar 113 is not in use, the pin 114 may be removed and the draw bar swung rearwardly for reducing the width of the machine.

The draw bar is shown in its rearwardly swung position in Figure 6. In this position, the machine will more easily pass through ordinary gates or other narrow passageways.

It will be seen from the foregoing that I have provided a corn picking and husking machine with a special frame adapted to be and in the present case actually combined with a tractor, the tractor being so assembled with relation to the picking and husking mechanism that the latter may have some pivotal movement with relation to the tractor on account of the arrangement of the shafts 21 and 45, shown in Figures 7 and 9, and on account of the pivotal mounting of the axle 24 on the shaft 25.

This permits the gathering arms to follow the surface of the ground, if it should be uneven and the wheel 16 should travel over high spots or low spots.

The front wheels of the tractor are removed from the tractor and mounted on the frame of the picking and husking machine. The picking and husking machine is allowed to tilt on the axle 10 and is adjusted to various tilting positions in the following manner:

On the frame shown in Figure 6 is mounted a short transverse shaft 116, shown in Figure 1, having on one end a lever 117 adjacent to which is an ordinary toothed sector 118. On the shaft 116 is an arm 119 (see Figure 3) to which is pivoted a link 120, which is in its turn pivoted to the inclined frame member 61 of the auxiliary frame.

By adjusting the lever 117, the auxiliary frame may be tilted to various positions of adjustment on the axle 10.

To guide leaning corn stalks from the front tractor wheels to the gathering arms, there is mounted on the front of the frame members 11 and 13, a guide arm 121, extending in front of the right-hand tractor wheel 26, as shown in Figures 1 and 3.

Supported on the spindle 122 of the right-hand wheel 26 is another guide member comprising the supporting bracket 123 on which is the flange 124, for guiding a stalk of corn from the arm 121 to the left-hand gathering arms 68. These guide devices are so arranged as to clear each other and the gathering arms when the front wheels are turned.

The wagon is usually hitched to the extended draw bar on the left side of the machine so that the pull of the wagon and its load will help to even up the side draft imposed on the tractor. However in starting new "lands" in the corn field, the wagon may be hitched directly behind the center of the tractor, thus making only one down row. When the wagon is thus hitched the discharge spout 111 is swung straight back. The pin 114 is removed and the draw bar 113 is folded toward the machine to avoid knocking down corn stalks.

The tractor wheels are set forward, because in most tractors, they are so far apart that in turning, one of them would not clear the gathering arms.

I claim as my invention:

1. In a machine of the class described, a substantially triangular frame including a transverse member, a tractor assembled therewith to permit the frame to tilt laterally, having its front axle and steerable front wheels removed from the tractor frame and said axle pivoted on a fore-and-aft axis on the triangular frame and operatively connected with the tractor steering mechanism, an auxiliary frame pivoted on a transverse axis on the transverse member of the first frame, picking mechanism supported on the auxiliary frame, and means for operating such mechanism from the tractor.

2. In a machine of the class described, a substantially triangular frame including a transverse member, a tractor assembled therewith by pivotal connections to allow relative movement of tractor and frame on a fore-and-aft axis, said tractor having its front axle and steerable front wheels removed and said axle pivoted on a fore-and-aft axis on the frame and operatively connected with the tractor steering mechanism, an auxiliary frame pivoted on the transverse member of the first frame on a transverse axis, picking mechanism supported on the auxiliary frame along side the tractor, corn husking mechanisms on the auxiliary frame, and means for operating such mechanisms from the tractor.

3. In a structure of the class described, a tractor, a triangular frame supported thereon at the front and rear thereof for pivotal movement on a fore-and-aft axis, a pair of laterally spaced corn picking mechanisms supported on said frame at the side of the tractor for tilting movement on a transverse axis, a husking mechanism pivotally supported on said frame behind the tractor and adapted to tilt with said picking mechanisms, and a common means for conveying picked corn from the picking mechanisms to the husking mechanism.

4. In a machine of the class described, the combination of a frame, comprising a transverse axle and forwardly extending converging frame members, a tractor assembled with said frame for pivotal movement on a fore-and-aft axis with relation to the frame, the front axle and the front, steerable wheels of the tractor being removed from said tractor and supported on said frame for permitting relative pivotal movement of the frame and the tractor front axle with respect to the tractor on a fore-and-aft axis, an auxiliary frame pivoted on said transverse axle on a transverse axis, a wheel for supporting said first axle, means for adjusting the auxiliary frame on the first frame for pivotal movement relative to the first frame, and corn picking and husking mechanisms on the auxiliary frame.

5. In a machine of the class described, a substantially triangular frame, a tractor connected therewith at its front and rear ends to permit the frame to tilt laterally, said tractor having its front axle and steerable front wheels removed from the tractor frame and the said axle pivoted on a fore-and-aft axis on the triangular frame and operatively connected with the tractor steering mechanism, an auxiliary frame pivoted on a transverse axis on the transverse member of the first frame, picking mechanism supported on the auxiliary frame, means for operating such mechanism from the tractor, and an auxiliary supporting wheel for said frame with its center in the line of said tilting movement.

6. In a machine of the class described, the combination of a frame, comprising a transverse member and forwardly extending converging frame members, a tractor assembled with said frame for pivotal movement on a fore-and-aft axis with relation to the frame, the front axle and the front, steerable wheels of the tractor being removed therefrom and supported on said frame for permitting relative pivotal movement of the frame and axle on a fore-and-aft axis, an auxiliary frame pivoted on said transverse member, a wheel for supporting said transverse member, means for adjusting the auxiliary frame on the first frame for relative pivotal movement on the transverse member, and corn picking and husking mechanisms on the auxiliary frame, the corn picking mechanism being located at the side of the tractor and the husking mechanism behind it, and an elevator extending rearwardly from the corn husking mechanism, having at its upper end a laterally adjustable discharge pipe.

7. In a machine of the class described, the combination of a frame, comprising a transverse member and forwardly extending converging frame members, a tractor assembled with said frame for pivotal movement on a fore-and-aft axis with relation to the frame, the front axle and the front, steerable wheels of the tractor being removed therefrom and supported on said frame for permitting relative pivotal movement of the frame and axle on a fore-and-aft axis, an auxiliary frame pivoted on said transverse member, a wheel for supporting said transverse member, means for adjusting the auxiliary frame on the first frame for relative pivotal movement on the transverse member, and corn picking and husking mechanisms on the auxiliary frame, the corn picking mechanism being located at the side of the tractor and the husking mechanism behind it, and an elevator extending rearwardly from the corn husking mechanism, having at its upper end a laterally adjustable discharge pipe, and extensible means for attaching a wagon to said machine at a point in the extended axis of said transverse member.

8. In a corn picking machine, a main corn picker frame assembled with a tractor, the rear end of the corn picker frame being connected pivotally with the rear end of the tractor frame to tilt on a longitudinal axis, converging side members of the picker frame connected in the front, pivotally with the front end of the tractor frame, steerable wheels on a portion of said side members extending forwardly from the tractor frame, an auxiliary frame pivotally mounted on the picker frame to tilt on a transverse axis and corn picking mechanism mounted on the auxiliary frame.

9. In a corn picking machine, a corn picker having a frame substantially triangular assembled with a tractor, the tractor frame being pivotally connected with the triangular picker frame at the front end and also pivotally connected with the picker frame at the inner rear end, means for supporting the outer rear end of said picker frame, an auxiliary frame mounted on the picker frame, picking mechanism on the auxiliary frame, and means for operating the picking mechanism from the tractor.

10. In combination with a tractor, means for operatively supporting a harvester mechanism with respect thereto, said means comprising a frame pivoted to the front and rear ends of the tractor, a wheel on one side and spaced from the tractor for supporting an outwardly extending portion of said frame, steerable wheels for supporting a forwardly extending portion of said frame ahead of the front end of the tractor, the steering mechanism of the tractor being extended to operatively connect with said steerable wheels.

Des Moines, Iowa, July 16, 1925.

SELL W. BARNETT.